(12) United States Patent
Morken et al.

(10) Patent No.: US 10,836,893 B2
(45) Date of Patent: Nov. 17, 2020

(54) CURING AGENTS FOR COMPOUNDS

(71) Applicant: DuPont Polymers, Inc., Wilmington, DE (US)

(72) Inventors: Peter A. Morken, Wilmington, DE (US); Amiya Ratan Tripathy, Garnet Valley, PA (US)

(73) Assignee: DUPONT POLYMERS, INC. DE (US)

( * ) Notice: Subject to any disclaimer, the term of this patent is extended or adjusted under 35 U.S.C. 154(b) by 0 days.

(21) Appl. No.: 15/777,407

(22) PCT Filed: Dec. 7, 2015

(86) PCT No.: PCT/US2015/642280
§ 371 (c)(1),
(2) Date: May 18, 2018

(87) PCT Pub. No.: WO2017/099708
PCT Pub. Date: Jun. 15, 2017

(65) Prior Publication Data
US 2018/0371227 A1     Dec. 27, 2018

(51) Int. Cl.
| | | |
|---|---|---|
| C08L 27/18 | (2006.01) | |
| C08K 5/23 | (2006.01) | |
| C08K 5/00 | (2006.01) | |
| C08K 3/04 | (2006.01) | |
| C08K 5/3492 | (2006.01) | |
| C08L 27/20 | (2006.01) | |
| C08K 5/353 | (2006.01) | |

(52) U.S. Cl.
CPC .......... C08L 27/18 (2013.01); C08K 3/04 (2013.01); C08K 5/0025 (2013.01); C08K 5/23 (2013.01); C08K 5/34924 (2013.01); C08K 5/353 (2013.01); C08L 27/20 (2013.01)

(58) Field of Classification Search
CPC combination set(s) only.
See application file for complete search history.

(56) References Cited

U.S. PATENT DOCUMENTS

| | | |
|---|---|---|
| 4,739,024 A | 4/1988 | Moggi et al. |
| 5,037,921 A | 8/1991 | Carlson |
| 5,231,154 A | 7/1993 | Hung |
| 5,370,931 A | 12/1994 | Fratangelo et al. |
| 5,409,998 A | 4/1995 | Chiodini et al. |
| 5,554,680 A | 9/1996 | Ojakaar Leo |
| 5,605,973 A | 2/1997 | Yamamoto et al. |
| 5,700,568 A | 12/1997 | Badesha et al. |
| 6,035,780 A | 3/2000 | Badesha et al. |
| 6,221,451 B1 | 4/2001 | Lauer et al. |
| 6,774,164 B2 | 8/2004 | Lyons et al. |
| 6,911,171 B2 | 6/2005 | Lauer |
| 7,138,470 B2 | 11/2006 | Fukushi et al. |
| 7,897,690 B2 | 3/2011 | Wang et al. |
| 7,991,340 B2 | 8/2011 | Qi et al. |
| 8,426,026 B2 | 4/2013 | Qi et al. |
| 8,722,780 B2 | 5/2014 | Shimizu et al. |
| 2004/0214956 A1 | 10/2004 | Aufdermarsh et al. |
| 2006/0084730 A1 | 4/2006 | Fukushima et al. |
| 2007/0100062 A1 | 5/2007 | Lyons et al. |
| 2010/0093898 A1 | 4/2010 | Campbell et al. |
| 2010/0286329 A1 | 11/2010 | Fukushi et al. |
| 2010/0324222 A1* | 12/2010 | Hung ............. C08L 27/16 525/200 |
| 2011/0245402 A1* | 10/2011 | Stanga ........... C08L 27/12 524/501 |
| 2013/0190456 A1* | 7/2013 | Hirano ........... C08L 27/18 525/326.2 |
| 2013/0240034 A1 | 9/2013 | Hatakeyama et al. |
| 2013/0345365 A1 | 12/2013 | Bish et al. |

FOREIGN PATENT DOCUMENTS

| | | | | |
|---|---|---|---|---|
| CN | 101361975 A | | 2/2009 | |
| CN | 101659817 A | * | 3/2010 | |
| CN | 102775864 A | | 11/2012 | |
| CN | 107690452 A | | 2/2018 | |
| DE | 4006058 A1 | * | 8/1991 | ............. C08K 5/14 |
| EP | 0444604 A2 | | 9/1991 | |
| JP | 62-104863 A | | 5/1987 | |
| JP | 05287030 A | * | 11/1993 | |
| JP | 2007-137994 A | | 6/2007 | |
| JP | 2008-517071 A | | 5/2008 | |
| JP | 4214646 B2 | | 1/2009 | |
| WO | 2004/035666 A2 | | 4/2004 | |
| WO | 2012/077583 A1 | | 6/2012 | |
| WO | WO-2016195900 A1 | * | 12/2016 | ............. C08K 5/353 |

OTHER PUBLICATIONS

Machine translation of DE 4006058 A1, retrieved Jul. 2019. (Year: 2019).*
Machine translation of CN 101659817 A, retrieved Jul. 2019. (Year: 2019).* Barbieri et al., "New fluoroelastomer Tecnoflon FOR 310 for Expanded Microcellular Items", Cell. Polym., Int'l Conf., 2nd Edition, vol. 3, Publisher Rapra Technol., 1993.
Barbieri et al., "New fluoroelastomer Tecnoflon FOR 310 for Expanded Microcellular Items", Cell. Polym., Int'l Conf., 2nd Edition, vol. 4, Publisher Rapra Technol., 1993.
Communication Pursuant to Article 94(3) EPC in EP Application No. 15820359.6 dated Mar. 15, 2019.
International Preliminary Report on Patentability in International Application No. PCT/US2015/064228, dated Jun. 12, 2018.

(Continued)

*Primary Examiner* — Nicole M. Buie-Hatcher

(57) ABSTRACT

A fluoroelastomer compound comprising at least one co-agent and at least one chemical entity comprising: (1) an azo functional group or (2) an oxazoline functional group, when cured into an article using a peroxide curing agent, the article exhibits no visible particles on the article surface when viewed at a magnification of 500 times that of an unmagnified image.

16 Claims, No Drawings

(56) References Cited

OTHER PUBLICATIONS

International Search Report and Written Opinion issued in International Application No. PCT/US2015/064228, dated Aug. 30, 2016.
Mori et al., "Assembled Structures and Chiroptical Properties of Amphiphilic Block Copolymers Synthesized by RAFT Polymerization of N-Acryloyl-L-alanine", Macro Chem and Physics, vol. 209, 2008, pp. 2100-2112.

* cited by examiner

CURING AGENTS FOR COMPOUNDS

OVERVIEW

Described herein are curing agents for use in compounds (also called curable compositions) and expressly including compounds comprising a perfluoroelastomer, and articles cured from these compounds.

Compounds that comprise a fluoroelastomer have achieved outstanding commercial success because they can be used in severe environments, in particular, during exposure to high temperatures and to aggressive chemicals. For example, these compounds are used in aircraft engine seals, in oil-well drilling devices, and as sealing elements in industrial equipment that operate at high temperatures.

The properties of cured compounds arise largely because of the stability and inertness of the copolymerized monomers that make up the major portion of the polymeric backbone of these compounds. Such monomers include tetrafluoroethylene and perfluoro(alkyl vinyl) ethers. In order to develop elastomeric properties fully, elastomer compounds are typically crosslinked, i.e., vulcanized or cured. To this end, a small percentage of cure sites need to be present in the compounds. Upon crosslinking, the cure sites react with a curing agent to form a crosslinked elastomer entity in the form of an article.

Cure sites described herein comprise one or more bromine atoms, one or more iodine atoms, a nitrile group, or combinations of these. Compounds comprising such cure sites may be cured by peroxide curing agents.

Cure site monomers comprising halogen atoms have been successfully incorporated into fluoroelastorners and the fluoroelastomer crosslinked by peroxide curing agents.

U.S. Pat. No. 7,138,470 discloses the use of halogen containing cure site monomers in fluoroelastomers and the vulcanization of the fluoroelastomer using peroxide curing acents.

U.S. Pat. No. 5,231,154 discloses fluoroelastomers comprising halogen cure sites and the vulcanization of the fluoroelastomer using peroxide curing agents and co-agents.

U.S. Pat. Application No. 2007/0100062 discloses fluoroelastomers comprising halogen cure sites and co-agents which may be cured using peroxide curing agents.

U.S. Pat. Application No. 2010/0286329 discloses iodine containing amorphous fluoropolymers which may be cured using peroxide curing agents.

When peroxide curing agents are used to cure the compounds, co-agents are sometimes used to modify the curing characteristics of the compound. Co-agents may be insoluble in the compound being cured. Upon curing, residual materials in the form of solid particles may be visible on the surface of the cured compound when the surface of the cured compound is viewed at a magnification of 500 times that of an unmagnified image.

Described herein are compounds comprising a fluoroelastomer comprising cure sites; one or more chemical entities selected from the group consisting of chemical entities comprising an azo functional group and chemical entities comprising an oxazoline functional group, and combinations of these; a peroxide curing agent; and a co-agent; which, when cured into articles, exhibit an improved surface appearance compared to cured compounds which are cured only with a peroxide and co-agent. Also described herein are articles comprising the compounds described herein as well as methods for preparing the articles.

DETAILED DESCRIPTION OF THE INVENTION

Abbreviations

The claims and description herein are to be interpreted using the abbreviations and definitions set forth below.

"h", "hrs" refers to hours.

"%" refers to the term percent.

"parts" refers to parts by weight.

"phr" refers to parts per hundred parts of fluoroelastomer (rubber); one of skill in the art uses and recognizes this term of measurement. For example, 3 parts of a component per 100 parts fluoroelastomer is written as 3 phr. In these compounds, processes, and articles described herein, phr is based on 100 parts of fluoroelastomer A.

"g" refers to grams

Definitions

As used herein, the article "a" refers to one as well as more than one and does not necessarily limit its referent noun to the grammatical category of singular number.

As used herein, the terms "about" and "at or about", when used to modify an amount or value, refers to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing in order to become a finished article. When an article is unfinished, the term "preform" may refer to that form, shape, configuration, any part of which may undergo further processing to become finished.

As used herein, when an article is finished, the term "article" refers to an item, thing, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, the terms "comprises," "comprising," "includes," "including," "has," "having" or any other variation of these, refer to a non-exclusive inclusion. For example, a process, method, article, or apparatus that comprises a list of elements is not limited to only the listed elements but may include other elements not expressly listed or inherent.

Further, unless expressly stated to the contrary, "or" refers to an inclusive, not an exclusive, or. For example, a condition A or B is satisfied by any one of the following. A is true (or present) and B is false (or not present), A is false (or not present) and B is true (or present), and both A and B are true (or present).

As used herein, terms that describe molecules or polymers follow the terminology in the IUPAC Compendium of Chemical Terminology version 2.15 (International Union of Pure and Applied Chemistry) of Sep. 7, 2009.

As used herein, the term "fluorinated olefin" refers to linear, branched, or cyclic hydrocarbon structures which comprise at least one unsaturated double bond and comprise at least one fluorine atom.

As used herein, the term "alkyl" refers to linear, branched, or cyclic hydrocarbon structures and combinations of there. Alkyl does not include aromatic structures. Examples of linear alkyl groups include methyl, ethyl, propyl, butyl, pentyl, and hexyl groups. Branched alkyl groups include for example s- and t-butyl, and isopropyl groups. Examples of cyclic hydrocarbon groups include cyclopropyl, cyclopentyl, cyclohexyl, cyclobutyl, and cyclooctyl groups.

As used herein, the term "alkoxy" or "alkoxyl" refers to alkyl groups attached to an oxygen atom by a single bond. The other bond of the oxygen atom is connected to a carbon atom. Examples include methoxy, ethoxy, propoxy, isopropoxy, cyclopropyloxy, and cyclohexyloxy.

As used herein, the term "compound" refers to a composition that is able to be cured, i.e., a curable composition, as well as to a mixture of chemical entities that comprises at least a fluoroelastomer, a curing agent, a co-agent, and a chemical entity comprising an azo functional group. The mixture of chemical entities has not been cured nor has undergone processing conditions that would cause the curing of the mixture of chemical entities to undergo curing.

As used herein, the prefix term "fluoro", when placed as a prefix before a chemical entity name, refers to a chemical entity that has at least one fluorine atom as exemplified by the following designations: fluoroelastomers, perfluoroelastomers, fluorovinyl, and perfluorovinyl ethers. The prefix "fluoro", when placed as a prefix before a chemical entity name, expressly includes "perfluoro" chemical entities. Thus, the prefix "fluoro", when preceding a chemical entity name, indicates both "fluoro-" entities and "perfluoro-" entities.

As used herein, the term "cured" refers to that resultant entity that comprised a fluoroelastomer and which has been exposed to those conditions that caused the fluoroelastomer molecules to form sufficient crosslinks among themselves (that is, curing conditions) such that the resultant entity takes on a form or shape or configuration or structure that cannot be reprocessed, molded, or extruded into a different one. That is, once a resultant entity which comprised a fluoroelastomer has been exposed to curing conditions to thereby be cured, that entity cannot be re-cured to take on a substantially different form or shape or configuration or structure.

As used herein, the terms "curing", "cured" refer to that processing of a compound, also called herein curable composition, which results in an entity taking on a form or shape or configuration or structure that cannot be reprocessed, molded, or extruded into a different one. Such processing refers to the "curing process/processing", which requires compounds to be exposed to certain conditions in order to initiate the curing process, such conditions called curing conditions. The resultant entity of the curing process is a "cured" entity, that is, an article as defined hereinabove. To be clear, curing results in compounds taking on a form or shape or configuration or structure of an article. Cured articles of compounds described herein include, but are not limited to, O-rings, tubes, seals, and gaskets.

The terms "curing", "cured" also expressly include differing degrees of processing of a compound such that the resultant entity takes on a form or shape or configuration or structure that cannot be reprocessed, molded, or extruded into a different one and which may exhibit certain physical properties as a result of the curing. To the point, these compounds may be initially cured to achieve a non-reprocessable form, shape, etc., which has been termed "cured" herein. The cured compounds may be further subjected to additional curing conditions, which provide additional, subsequent curing. Such additional curing conditions may be variously termed herein either as "curing" or as "post-curing". That is, the terms "curing", "cured" refer to both an initial curing process that results in a first cured, resultant entity and also expressly refer to any subsequent curing process that results in a subsequently cured, resultant entity that may or not possess different material or physical properties than those of the first cured, resultant entity.

As used herein, the terms "particle" or "particles" refer to extraneous and unintentional solid organic materials which are not soluble in the cured compounds. The particles appear randomly in the cured compounds. These particles can be of various sizes but are typically round or oval in shape although other shapes are envisioned. The particles are of a size such that they cannot be seen using the unaided human eye. The term is not meant to include fillers and additives which are homogeneously mixed or blended into the compounds described herein such as carbon black particles or inorganic fillers.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Generally

Described herein are compounds that comprise a fluoroelastomer comprising cure sites; one or more co-agents; one or more chemical entities selected from the group consisting of chemical entities comprising an azo functional group and chemical entities comprising an oxazoline functional group, and combinations of these; and a peroxide curing agent. Also described herein are articles that have been cured and which, before curing, comprised such compounds. The articles, after curing, exhibit no visible particles on the surface when the surface of the article is viewed at a magnification of 500 times that of an unmagnified image.

Also described herein are processes for curing the compounds described herein.

More specifically, the compounds described herein comprise:

A. a fluoroelastomer A comprising copolymerized units of:
   (1) one or more fluorinated olefins;
   (2) one or more fluorovinyl ethers selected from the group consisting of perfluoro(alkyl vinyl) ethers, perfluoro(alkoxy vinyl) ethers, fluoro(alkyl vinyl) ethers, fluoro(alkoxy vinyl) ethers, and mixtures of these;
   (3) one or more chain transfer agents or fluorinated monomers comprising cure sites;

B. 0.1 to 10 parts per 100 parts fluoroelastomer A of one or more co-agents B selected from the group consisting of triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, N,N-diallylacrylaminde, and combinations of these;

C. 0.05 to 5 parts per 100 parts fluoroelastomer A of at least one chemical entity comprising:
   (1) an azo functional group;
   (2) an oxazoline functional group;

D. 0.01 to 10 parts per 100 parts fluoroelastomer A of a peroxide curing agent; wherein, when the compound has been cured into an article, the article exhibit no visible particles on the article surface when viewed at a magnification of 500 times that of an unmagnified image.

The processes described herein comprise the steps of:
a) providing a fluoroelastomer A comprising copolymerized units of:
   (1) at least one fluorinated olefin;
   (2) at least one fluorovinyl ether selected from the group consisting of perfluoro(alkyl vinyl) ethers, perfluoro(alkoxy vinyl) ethers, fluoro(alkyl vinyl) ethers, fluoro(alkoxy vinyl) ethers, and mixtures of these;
   (3) at least one chain transfer agent or fluorinated monomer comprising cure sites; and
b) curing fluoroelastomer A with at least one co-agent B, a chemical entity comprising an azo functional group or an oxazoline functional group, and a peroxide curing agent.

Variations in compounds, articles, and processes for curing compounds described herein may expressly include or exclude any of the following elements or any combination of the following elements. That is, it is expressly contemplated that compounds, articles and processes described herein and recited in the claims may be varied to include or exclude the specific elements listed in this paragraph or any combination of these specific elements:

the fluorinated olefin A(1) may be selected from the group consisting of tetrafluoroethylene, hexafluoropropylene, 1,1-difluoroethylene; 1,1,2-trifluoroethylene; 1-fluoroethylene, and mixtures of these; and/or the fluorinated olefin co-monomer A(2) may be selected from the group consisting of perfluoro(alkyl vinyl) ethers, perfluoro(alkoxy vinyl) ethers, fluoro(alkyl vinyl) ethers, fluoro(alkoxy vinyl) ethers, and mixtures of these; and/or the one or more chain transfer agents or fluorinated monomers comprising cure sites A(3) may be selected from the group consisting of chain transfer agents having the formula YRX, where R may be a $C_1$ to $C_6$ hydrocarbon, a $C_1$ to $C_8$ fluorohydrocarbon, a $C_1$ to $C_8$ chlorofluorohydrocarbon, or a $C_2$ to $C_{10}$ perfluorocarbon, wherein X and Y are independently iodine or bromine; chain transfer agents having the formula $Y(CH_2)m(CF_2)n(CH_2)pX$, wherein m, n, and p are integers from 0 to 10 and m+n+p is at least 1, and where X and Y are independently selected from bromine or iodine; diiodomethane; 1,2-diiodoethane; 1,2-dibromoethane; 1,2-diiodoperfluoroethane; 1,3-diiodoperfluoropropane; 1,2-dibromoperfluoropropane; 1,4-diiodoperfluobutane; 1,5-diiodoperfluoropentane; 1,6-diiodoperfluorohexane; 1,7-diiodoperfluoroheptane; 1,8-diiodoperfluorooctane; 1,10-diiodoperfluorodecane; and combinations of these; and/or the one or more chain transfer agents or fluorinated monomers comprising cure sites A(3) may be selected from the group consisting of fluorinated olefins that include nitrile containing functional groups or which comprise one or more bromine atoms or one or more iodine atoms or mixtures of these;

compounds may comprise one or more co-agents B ranging from 0.1 to 10 parts and selected from the group consisting of triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamicle, tri(diallylamine)-s-triazine, triallyl phosphite, N,N-diallylacrylaminde, and combinations of these; and/or compounds may comprise one or more chemical entities C selected from chemical entities comprising an azo functional group, chemical entities comprising an oxazoline functional group, and combinations of these, ranging from 0.1 to 5 parts; and/or the chemical entities comprising an azo functional group may be selected from the group consisting of 2,2'-Azobis(2,4-dimethylvaleronitrile); 2,2'-Azobis(2-methylbutyronitrile); and/or the chemical entities comprising an oxazoline functional group may be selected from the group consisting of 1,3-Bis(4,5-dihydro-2-oxazolyl)benzene; 1,4-Bis(4,5-dihydro-2-oxazolyl)benzene; 1,2-Bis(4,5-dihydro-2-oxazolyl)benzene; and/or these compounds may comprise peroxide curing agent D ranging from about 0.1 to 10 parts; and/or the peroxide curing agents D may be selected from the group consisting of dicumyl peroxide; 2,5-dimethyl-2,5-di(t-butylperoxy)hexane; di-t-butyl peroxide; t-butylperoxy benzoate; 2,5-dimethyl-2,5-di(t-butylperoxy)hexane-3; lauryl peroxide; 1,1-bis(t-butylperoxy) -3,5,5-trimethylcyclohexane; 1,1-bis(t-butylperoxy) cyclohexane; 2,2-bis (t-butylperoxy)octane; n-butyl-4,4-bis(t-butylperoxy)valerate; 2,2-bis(t-butylperoxy)butane; 2,5- dimethylhexane-2,5-dihydroxyperoxide; di-t-butyl peroxide; t-butylcumyl peroxide; α, α'-bis(t-butylperoxy-m-isopropyl)benzene; benzoyl peroxide, t-butylperoxybenzene; 2,5-dimethyl-2, 5-di(benzoylperoxy)-hexane; t-butylperoxymaleic acid; t-hutylperoxyisopropylcarbonate; and mixtures of these; and/or these compounds may further comprise at least one filler; and/or the at least one filler may be selected from the group comprising nonperfluoro-fluorine-containing elastomers, micropowders, carbon black, stabilizers, plasticizers, lubricants, processing aids, and mixtures of these.

Compounds

A) Fluoroelastomers

Fluoroelastomers A described herein may be fluorinated or perfluorinated and comprise at least the following three copolymerized units: A(1) about 25 to 74.9 mole percent of one or more fluorinated olefins; A (2) about 25 to 74.9 mole percent of one or more fluorinated olefin co-monomers different than fluorinated olefin A(1) and are selected from the group consisting of fluorovinyl ethers, fluorinated olefins, olefins, and mixtures of there; and A(3) about 0.1 to 10 mole percent of one or more chain transfer agents or one or more cure site monomers selected from the group consisting of nitrile-containing fluorinated olefins, nitrile-containing fluorinated vinyl ethers, or a mixture of chain transfer agents and cure site monomers, wherein the mole percent of each of A (1), (2), and (3) is based on the total mole percent of A (1), (2), and (3) in fluoroelastomer A.

Fluoroelastomers A described herein may contain any of a variety of end groups as a result of the use of varying initiators or chain transfer agents during polymerization. Non-limiting examples of end groups include sulfonate, sulfonic acid, carboxylate, carboxylic acid, carboxamide, difluoromethyl groups, trifluorovinyl groups, or perfluorinated alkyl groups.

A (1) Fluorinated Olefins

Fluorinated olefins A (1) include unsaturated monomers comprising at least one fluorine atom, preferably at least two fluorine atom, and most preferably perfluorinated monomers. Examples of fluorinated olefins include tetrafluoroethylene ($C2F_4$), hexafluoropropylene, 1,1-difluoroethylene; 1,1,2-trifluoroethylene; 1-fluoroethylene, and combinations of these. The concentration of fluorinated olefin A(1) may range from 25 and 74.9 mole percent of the total moles of copolymerized units in fluoroelastomer A.

A) (2) Fluorinated Olefin Co-Monomers

Fluorinated olefin co-monomer A(2), which is different than fluorinated olefin A (1) is selected from the group consisting of fluorovinyl ethers, fluorinated olefins, olefins, and mixtures of these.

Examples of fluorovinyl ethers used to prepare fluoroelastomer A include, perfluoro(alkyl vinyl) ethers (PAVE), perfluoro(alkoxy vinyl) ethers, fluoro(alkyl vinyl) ethers, fluoro(alkoxy vinyl) ethers, and mixtures of these. Suitable perfluorinated(alkyl vinyl) ethers which may be used to prepare the compounds described herein include those shown in formulas (I) to (V):

$$CF_2=CFO(R_fO)_n(R_{f'}O)_mR_{f'} \quad (I),$$

where $R_{f'}$ and $R_{f''}$ are different linear or branched perfluoroalkylene groups of 2-6 carbon atoms, m and n are independently 0-10, and is $R_f$ a perfluoroalkyl group of 1-6 carbon atoms.

Additional examples of perfluoro(alkyl vinyl) ethers includes compositions of formula (II):

$$CF_2=CFO(CE_2CFXO)_nR_f \quad (II),$$

where X is F or $CF_3$, n is 0-5, and $R_f$ is a perfluoroalkyl group of 1-6 carbon atoms. Preferably, n is 0 or 1 and $R_f$ contains 1-3 carbon atoms. Examples of such perfluorinated (alkyl vinyl) ethers include perfluoro(methyl vinyl) ether and perfluoro(propyl vinyl) ether, Other perfluoro(alkyl vinyl) ether monomers for the preparation of fluoroelastomer A include monomers of formulas (III), (IV), and (V):

$$CF_2=CFO[(CF_2)_mCF_2CFZO] \quad (III),$$

where $R_f$ is a perfluoroalkyl group having 1-6 carbon atoms, m=0 or 1, n=0-5, and Z=F or $CF_3$;

$$CF_2=CFO[(CF_2CFCF_3O)_n(CF_2CF_2CF_2O)_m(CF_2)_p]C_xF_{2x+1} \quad (IV),$$

where m and n=1-10, p=0-3, and x=1-5. Specific embodiments of this class include monomers where n=0-1, m=0-1, and x=1 and $$CF_2=CFOCF_2CF(CF_3)O(CF_2O)_nC_nF_{2n+1} \quad (V),$$

where n=1-5, m=1-3, and where, preferably, n=1.

Examples of perfluoro(alkyl vinyl) ethers include perfluoro methyl vinyl ether, perfluoropropyl vinyl ether, and perfluoroethyl vinyl ether. Examples of perfluoro(alkoxy vinyl) ethers include perfluoromethoxy vinyl ether, perfluoropropoxy vinyl ether, and perfluoroethoxy vinyl ether.

Examples of fluorinated olefins include tetrafluoroethylene ($C2F_4$); hexafluoropropylene; 1,1-difluoroethylene; 1,1,2-trifluoroethylene; 1-fluoroethylene; 1-fluoropropylene; 1,1-difluoropropylene; 1,1,3-trifluoropropylene; 1,1,3,3,3-pentafluoropropylene; and combinations of these. Examples of unsaturated olefins include ethylene, propylene, 1-butene, 2-butene, and combinations of these. Mixtures of fluorovinyl ethers, fluorinated olefins, and unsaturated olefins may also be used.

The concentration of fluorinated olefin co-monomer in fluoroelastomer A ranges from 25 to74.9 mole percent, preferably from 30 to 65 mole percent, more preferably from 45 to 55 mole percent, based on the total mole percent of copolymerized units in fluoroelastomer A.

A (3) Fluorinated Monomer Comprising Cure Sites

Fluoroelastomer A further comprises copolymerized units of one or more chain transfer agents and/or one or more fluorinated monomers comprising cure sites, generally in amounts of from 0.1 to 10 mole percent, preferably between 0.3 and 1.5 mole percent, based on the total mole percent of copolymerized units used to prepare fluoroelastomer A.

When a cure site monomer is used, more than one type of cure site monomer may be present. Suitable cure site monomers include fluorinated olefins that include nitrile containing functional groups or which comprise one or more bromine atoms or one or more iodine atoms or mixtures of these.

Such fluorinated olefins include cure site monomers having formula (VI) or (VII):

$$CR^1R^2=(CR^3R^4)_n-CR^5R^6 \quad (VI)$$

where n=1-4; $R^1$, $R^2$, $R^3$, $R^4$, and $R^5$=H or F wherein at least one of $R^1$ to $R^5$ is F; and $R^6$ is Br or I, preferably I; or $$CF_2=CF-O(CR^7R^8)_n-R^9 \quad (VII)$$

where n=1-4; $R^7$ and $R^8$=H or F wherein at least one of $R^7$ or $R^8$ is F; and $R^9$ is Br or I, preferably I;

Useful nitrile-containing cure site monomers include those of formulae (VIII)-(XI):

$$CF_2=CF-O(CF_2)_n-CN \quad (VIII),$$

where n=2-12, preferably 2-6;

$$CF_2=CF-O[CF_2-CFCF_3-O]_n-CF_2-CFCF_3-CN \quad (IX),$$

where n=0-4, preferably 0-2;

$$CF_2=CF-[OCF_2CFCF_3]_x-O-(CF_2)_n-CN \quad (X),$$

where x=1-2, and n=1-4; and $$CF_2=CF-O-(CF_2)_n-O-CF(CF_3)CN \quad (XI),$$

where n=2-4.

When nitrile containing cure site monomers are used, the nitrile containing cure site monomers of formula (X) are preferred. Especially preferred nitrite containing cure site monomers include perfluorinated polyethers having a nitrile group and a trifluorovinyl ether group. A most preferred nitrile containing cure site monomer is perfluoro(8-cyano-5-methyl-3,6-dioxa-1-octene)(8-CNVE) and represented by formula (XII):

$$CF_2=CFOCF_2CF(CF_3)OCF_2CF_2CN \quad (XII)$$

A (3) Chain Transfer Agent

When a chain transfer agent is used in fluoroelastomer A in place of or in addition to a fluorinated monomer comprising a nitrite cure site, the chain transfer agent may be of the formula YRX, where R may be a $C_1$ to $C_6$ hydrocarbon, a $C_1$ to $C_8$ fluorohydrocarbon, a $C_1$ to $C_8$ chlorofluorohydrocarbon, or a $C_2$ to $C_{10}$ perfluorocarbon, wherein X and Y are independently iodine or bromine Such chain transfer agents include those of formula $CH_2X_2$ where X is iodine or bromine; $X(CF_2)_nY$ where X and Y are independently selected from bromine or iodine and n is an integer from 3 to 10.

The chain transfer agent may also be of the formula $Y(CH_2)_m(CF_2)_n(CH_2)_pX$, wherein m, n, and p are integers from 0 to 10 and m+n+p is at least 1, and where X and Y are independently selected from bromine or iodine.

Specific examples of chain transfer agents include diiodomethane;1,2-diiodoethane; 1,2-dibromoethane 1,2-diiodoperfluoroethane; 1,3-diiodoperfluoropropane; dibromoperfluoropropane; 1,4-diiodoperfluorobutane; 1,5-diiodoperfluoropentane; diiodoperfluorohexane;1,7-diiodoperfluoroheptane;1,8-diiodoperfluorooctane; and 1,10-diiodoperfluorodecane.

B) Co-Agent

Co-agent B may be selected from the group consisting of triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, N,N-diallylacrylaminde, and combinations of these. Preferably, the co-agent is triallyl isocyanurate.

C) Chemical Entities Comprising an Azo or Oxazoline Functional Group

C(1) Chemical Entities Comprising an Azo Functional Group

The chemical entities C(1) comprising an azo functional group in the compounds described herein may be defined by formulas (XIII), (XIV), and (XV):

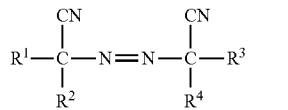

(XIII)

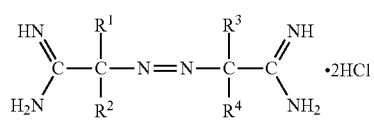

(XIV)

wherein each of $R^1$, $R^2$, $R^3$, and $R^4$ is selected from the group consisting of $C_1$ to C8 alkyl groups in which the alkyl group is linear, branched, or cyclic; and

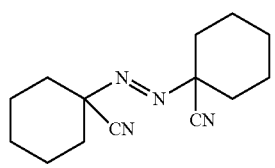

(XV)

Non-limiting examples of chemical entities comprising an azo functional group include 2,2'-azobis(2-methylpropionamidine)dihydrochloride; 1,1'-azobiscyclohexanecarbonitrile; 2,2'- azobis-(2-isobutyronitrile); 2,2'-azobis[2-(2-imidazolin-2-yl)propane]dihydrochloride; 2.2'-azobis(2,4-dimethylvaleronitrile); Dimethyl-2,2-azobisisobutyrate; 2,2'-azobis(2-amidinopropane) hydrochloride; 2,2'-azobis (2-methylbutyronitrile); 2,2'-azobis(N,N'-dimethyleneisobutyramide); 2,2'-azobis(2-methyl-N-(2-hydroxyethyl)propionamide); 2,2'-azobis[N-(2-carboxyethyl)-2-methylpropionamidine]hydrate; polycondensation product of 4,4'-azobis(4-cyanovaleric acid) and polyethylene glycol (CAS # 105744-24-9); and polycondensation product of 4,4'-azobis(4-cyanoyaleric acid) polymer with alpha, omega-bis(3-aminopropyl)polydimethylsiloxane (CAS # 158947-07-0). The chemical entities comprising an azo functional group may be in the form of a salt as shown by example (XIV) or in the neutral or non-ionic form as shown by formulas (XIII) and (XV).

C(2) Chemical Entities Comprising an Oxazoline Functional Group

The chemical entities comprising an oxazoline functional group in the compounds described herein may be defined by formulas (XVI), (XVII), and (XVIII):

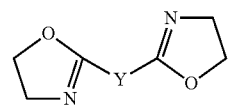

(XVI)

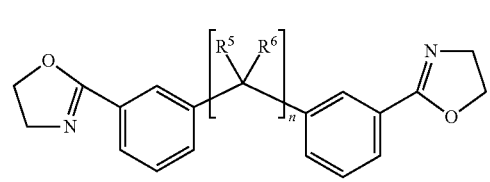

(XVII)

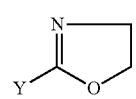

(XVIII)

wherein:

Y is selected from the group consisting of benzene, naphthalene, and biphenyl;

n is an integer from 1 to 6; $R^5$ and $R^6$ are independently selected from the group consisting of H and $C_1$ to C8 alkyl groups in which the alkyl group is linear, branched, or cyclic. The chemical entities comprising an oxazoline functional group may be in the form of a salt.

It is to be understood that the chemical entities comprising an oxazoline functional group in the compounds described herein and defined by formulas (XVI), (XVII), and (XVIII) includes chemical entities wherein the oxazoline functional group may be substituted for any hydrogen atom of the aromatic ring(s). To be clear, the oxazoline functional group may be a substituent on any carbon atom of the aromatic ring(s) that is capable of being bonded to a hydrogen atom. For example, formula (XIX) shows the oxazoline functional group attached at the meta positions on the benzene ring. The oxazoline functional group replaced the hydrogen atoms that were at the meta locations of the benzene ring.

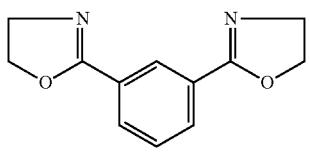

(XIX)

The compounds described herein may comprise chemical entities comprising an azo or oxazoline functional group. The total concentration of chemical entities comprising an oxazoline functional group used generally will be from about 0.1 to 10 phr, preferably 1 to 5 phr, and more preferably from 1 to 3 phr. The total concentration of chemical entities comprising an azo functional croup used generally will be from about 0.1 to 5 phr, preferably 0.5 to 3 phr, and more preferably from 0.5 to 2.5 phr.

D) Peroxide Curing Agent

Peroxide curing agents for the compounds described herein include organic peroxides. Preferred organic peroxides, are those that do not decompose during dynamic mixing temperatures to prepare the compounds comprising a fluoroelastomer but which generate peroxide radicals under curing conditions. Examples of non-limiting organic peroxides include dicumyl peroxide; 2,5-dimethyl-2,5-di(t-butylperoxy)hexane; di-t-butyl peroxide; t-butylperoxy benzoate; 2,5-dimethyl-2,5-di(t-butylperoxy)hexane-3; lauryl peroxide; 1,1-bis(t-butylperoxy) -3,5,5-trimethylcyclohexane; 1,1-bis(t-butylperoxy) cyclohexane; 2,2-bis(t-butylperoxy)octane; n-butyl-4,4-bis (t-butylperoxy)valerate; 2,2-bis(t-butylperoxy)butane; 2,5-dimethylhexane-2,5-dihydroxyperoxide; di-t-butyl peroxide; t-butylcumyl peroxide; α, α'-bis(t-butylperoxy-m-isopropyl)benzene; benzoyl peroxide, t-butylperoxybenzene; 2,5-dimethyl-2,5-di(benzoylperoxy)-hexane; t-butylperoxymaleic acid; and t-butylperoxyisopropylcarbonate.

The concentration of peroxide curing agent used generally will be from about 0.1 to 10 phr, preferably 1 to 5 phr, and more preferably from 1 to 3 phr.

Additives

The compounds described herein may additionally comprise a non-perfluoro-containing elastomer capable of independently cross-linking with any fluoroelastomer A cure sites. Examples of the non-perfluoro-containing elastomer are those having, at least at either its main chain or an end of its side chain, at least one kind of crosslinkable group selected from the group consisting of: cyano (—CN), carboxyl (—COOH), alkoxycarbonyl (—COOR$_9$, where R$_9$ is a monovalent organic group), and an acid halide group (—COX$_1$, where X$_1$ is a halogen atom) capable of a cross-linking reaction with fluoroelastomer A.

Examples of non-perfluoro-containing elastomers include, but are not limited to, a fluorine-containing, but not a perfluoro-containing, rubber; a thermoplastic fluorine-containing rubber; and a rubber composition comprising a fluorine-containing rubber.

The fluorine-containing rubber may contain a monomer unit independently selected from the group consisting of vinylidene fluoride (VDF), tetrafluoroethylene, and hexafluoropropylene, and at least one additional monomer such as tetrafluoroethylene, hexafluoropropylene, perfluoro(alkyl vinyl ether), chlorotrifluoroethylene, trifluoroethylene, trifluoropropylene, pentafluoropropylene, trifluorobutene, tetrafluoroisobutene, vinyl fluoride, and iodine-containing fluorinated vinyl ethers, ethylene, propylene, alkyl vinyl ether, and combinations of these.

Additives such as carbon black, stabilizers, plasticizers, lubricants, fillers, and processing aids typically utilized in compounding can be incorporated into the compounds described herein, provided they have adequate stability for the intended service conditions. In particular, low temperature performance can be enhanced by incorporation of perfluoropolyethers.

Carbon black fillers may be used in elastomers as a means to balance modulus, tensile strength, elongation, hardness, abrasion resistance, conductivity, and processability of these compounds. In these compounds, small particle size, high surface area carbon blacks are preferred. A grade of carbon black commonly chosen is SAF carbon black, a highly reinforcing black with an average particle size of about 14 nm and designated N 110 in Group No. 1, according to ASTM D1765. A particular class of carbon blacks useful in these compounds are those described in U.S. Pat. No. 5,554,680. These carbon blacks have average particle sizes of at least about 100 nm to about 500 nm as determined by ASTM D 3849. Examples include MT blacks (medium thermal black) designated N-991, N-990, N-908, and N-907, and large particle size furnace blacks. MT blacks are preferred. When carbon black is added, the particle size ranges from 1 to 70 phr, preferably from about 0.01 to about 50 phr, more preferably from 1 to 50 phr, and most preferably from 10 to 50 phr.

In addition to, or in combination with carbon black fillers, non-carbon black fillers may be present in the compounds described herein. An example of a non-carbon black filler that may be used includes anhydrous silica such as acidic silica or fumed silica. Such silicas are available from Degussa Aktiengesellschaft (Frankfurt, Germany) under the Aerosil® trademark. A particularly useful type is Aerosil® 200 silica. Other suitable silicas include Reolosil® silicas, available from Tokuyama KK (Tokyo, Japan), for example Reolosil® QS13, Reolosil® QS102, and Reolosil® QS30. Silica amounts range from 1 to 25 phr, but preferably no more than 1 to 7 phr.

Additional types of fillers include micropowders or fluoroadditives. Micropowders are ordinarily partially crystalline polymers. Micropowders include finely divided, easily dispersed plastic fluoropolymers that are solid at the highest temperature utilized in fabrication and curing of the compounds described herein. The term "solid" refers to a plastic fluoropolymer that has a crystalline melting temperature above the processing temperature(s) of the compounds described herein.

Micropowders that can be used in these compounds include, but are not limited to, micropowders based on the group of polymers known as tetrafluoroethylene (TFE) polymers. This group includes polytetrafluoroethylene (PTFE) and copolymers of TFE with small concentrations of about 1 mole percent or less of at least one copolymerizable modifying monomer such that the micropowders do not melt or soften during processing of fluoroelastomer A that comprise the micropowders. The modifying monomer may be, for example, hexafluoropropylene (HFP), perfluoro(propyl vinyl) ether (PPVE), perfluorobutyl ethylene, chlorotrifluoroethylene, or another monomer that introduces side groups into the polymer molecule.

Tetrafluoroethylene polymers used as additives in these compounds include copolymers of TFE having sufficient concentrations of copolymerized units of one or more monomers to reduce the melting point below that of PTFE. Such copolymers generally have melt viscosity in the range of 0.5-60×10$^3$ Pa·s, but viscosities outside this range are also known. Perfluoroolefins and perfluoro(alkyl vinyl) ethers are preferred comonomers. Hexafluoropropylene and perfluoro (propyl vinyl) ether are most preferred. Examples of TFE copolymers include TFE/hexafluoropropylene copolymer and TFE/perfluoro(propyl vinyl)ether copolymers, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The amount of non-carbon black fill in these compounds ranges from about 0.01 to 33 phr and preferably at least about 1 to 5 phr.

Preparing Compounds Described Herein and Curing Articles Described Herein that Comprised These Compounds The compounds described herein may be prepared by mixing until homogeneous fluoroelastomer A, co-agent B, chemical entity C, peroxide curing agent D, and when present, additives such as carbon black, processing aid(s), and filler(s), using rubber compounding procedures such as a two roll rubber mill, an internal mixer, for example, a Banbury internal mixer, or in an extruder.

The compounds described herein may be cured by the application of heat and/or of pressure sufficient to cause the peroxide curing agent(s) to form crosslinks with the cure sites in the compounds. When compression molding is used to cure the compounds, a press cure cycle is preferably followed by a post cure cycle during which the press cured compound is heated at elevated temperatures in excess of 300° C. for several hours. The compounds described herein, when cured, become articles described herein and exhibit useful and suitable thermal stability and chemical resistance for the applications in which these articles are used. Additionally, the compounds described herein, when cured, exhibit no visible particles on the article surface when viewed at a magnification of 500 times that of an unmagnified image.

These articles are particularly useful as seals and gaskets for high temperature applications and in a broad range of chemical environments, and in seals for high temperature automotive uses, and as O-rings.

Use of Compounds

The compounds described herein may be cured into articles such as O-rings and seals. It is believed that the specific combination of co-agent B, peroxide D, and chemical entity C, when used for curing the disclosed fluoroelastomers A, results in articles described herein (also known as cured compounds) that exhibit no visible particles on the article surface when viewed at a magnification of 500 times that of an unmagnified image.

Articles described herein in which chemical entity C comprises an azo functional group also exhibit compression set values of 70 percent or less when measured at 200° C. for 672 hours in air according to ASTM D395-89. Compression set of articles described herein in which chemical entity C comprises an azo functional group, is at least 10 percent less than the compression set of articles of identical composition and measured for the same duration and by the same method, but lacking chemical entity C.

EXAMPLES

The exemplary compounds identified by "E" in the table below are intended only to further illuminate and not to limit the scope of compounds, processes, and articles described and recited herein. Comparative examples are identified in the tables below by "C".

Materials

In the compounds, processes, and articles exemplified in the table below, the following materials were used:

FP-A is prepared from tetrafluoroethylene, perfluoro(methyl vinyl) ether and a diiodoalkane. The perfluoropolymer has a Mooney viscosity at 121° C. of 37 (ML1+10) measured according to ASTM D1646-07. FP-A can be prepared by the process disclosed in U.S. Pat. No. 6,774,164 example 8.

Perfluoro(methyl vinyl) ether: available from E.I. DuPont de Nemours and Company, Wilmington, DE ["DuPont"].

Co-agent: triallyl isocyanurate in a silicon-dioxide carrier, available as TAIC DLC®-A 72% from Harwick Standard Distribution Corporation, Akron, Ohio, USA.

Peroxide: 2,5-Dimethyl-2,5-di(t-butylperoxy) hexyne-3/calcium carbonate/amorphous silica mixture, available as VAROX 130-XL from Vanderbilt Chemicals, LLC, Norwalk, Conn.

Processing Aid: a blend of fatty acid derivatives and waxes, available as STRUKTOL HT-290 from Strucktol Company of America, Stow, Ohio, USA, Carbon Black: a carbon black pigment, available as Thermax® Ultra Pure N908 from Cancarb Limited, Alberta, Canada ["Cancarb"].

Azo-A: 2,2'-Azobis(2-methylpropionamidine)dihydrochloride available as Wako® 501 from Wako Pure Chemical Industries, Ltd., Japan.

Azo-B: 1,1'-Azobiscyclohexanecarbonitrile available as Vazo® 88 from DuPont.

Azo- C: 2.2'azobis-(2-isobutyronitrile) available as Vazo® 64 from DuPont.

Oxazoline-A: 1,3-Bis(4,5-dihydro-2-oxazolyl) benzene (CAS # 34052-90-9) available as B1511 from TCI America, Portland, Oreg., USA.

Specific Process for Preparing Articles Described Herein

The following specific process may be used to prepare articles described herein from compounds described herein:

A sheet of compound was extruded on a roll mill to a thickness of about 2 mm or a thickness that provides a one inch circular washer punched out of the extruded sheet having a weight of about 10 grams. If the punched out one inch circular washer weighs less than 10 g, the sheet is re-extruded with a wider gap in the nip roll until a punched test sample is at least 10 g. Circular washer test samples of the compound were used to prepare O-rings by the following cure process.

Standard 214 size O-rings (3 cm×0.34 cm) were compression molded from the circular washer test samples in an 8"×8" PHI press using max. 35000 psi pressure at 165° C. for Tgo plus 5 minutes. The O-ring samples were further cured, i.e., post-cured, by ramping the temperature from room temperature to 260° C. over a period of 40 hrs. and holding at a temperature of 260° C. for 8 hours in a nitrogen purged oven. The oven was then turned off and the O-ring allowed to cool to 50° C. at which time the O-ring is removed from the oven and allowed to cool to room temperature prior to testing. The O-rings are used for visual surface evaluation with the results shown in Table 1.

Surface Imperfection Test

A set of five O-rings prepared from each of the compounds disclosed in Table 1 were evaluated for surface imperfections using a Nikon SMZ-U microscope. The microscope was set to a magnification of 500 times greater than an unmagnified image and each set of five O-rings were visually inspected using the human eye. If upon this visual inspection, any particles of are visible on the surface of any one of the five O-rings in the set, the O-ring set fails the surface imperfection test. If no particles are visible on the surface of all five O-rings in the set upon visual inspection, the O-ring set passes the surface imperfection test.

Determination of Compression Set

O-rings (3 cm×0.34 cm), prepared as described in the immediately preceding paragraphs, were compression tested at 200° C. for 672 hours in air in accordance with ASTM D395-89. Compression set values of the articles described herein were compared to control (C1) which does not comprise a chemical entity C and the improvement in compression set was recorded as percent improvement compared to the compression set value of C1. For example, compression set of C1 is 79 percent and the compression set value of E3 is 70 percent. E3 has an 11 percent improvement (70/79) in compression set compared to C1.

Table 1 shows that composition C1, which does not comprise a chemical entity comprising an azo functional group or oxazoline functional group, fails the surface imperfection test. Examples E1 to E3 are identical to C1 except for the presence of a chemical entity comprising an azo functional group and the concentration of co-agent. Examples E1 to E3 all pass the surface imperfection test when a chemical entity comprising an azo functional group is present in the compound, even with a higher concentration of co-agent than C1.

Examples E4 and E5 are identical to C1 except for the presence of a chemical entity comprising an oxazoline functional group and the concentration of co-agent for E5. Examples E4 to E5 also passed the surface imperfection test when a chemical entity comprising an oxazoline functional group was used in the compound.

TABLE 1

| COMPONENTS (PHR*) | C₁ | E₁ | E₂ | E₃ | E₄ | E₅ |
|---|---|---|---|---|---|---|
| FP-A | 100 | 100 | 100 | 100 | 100 | 100 |
| Carbon Black | 12.5 | 12.5 | 12.5 | 12.5 | 12.5 | 12.5 |
| Processing aid | 0.8 | 0.8 | 0.8 | 0.8 | 0.8 | 0.8 |
| Co-agent | 2 | 3 | 3 | 3 | 2 | 1 |
| Peroxide | 1.25 | 1.25 | 1.25 | 1.25 | 1.25 | 1.25 |
| Azo-A | 0 | 2 | 0 | 0 | 0 | 0 |
| Azo-B | 0 | 0 | 2 | 0 | 0 | 0 |
| Azo-C | 0 | 0 | 0 | 2 | 0 | 0 |
| Oxazoline-A | 0 | 0 | 0 | 0 | 2 | 1.5 |
| Physical Properties | | | | | | |
| Surface Imperfection Test (Pass/Fail) | Fail | Pass | Pass | Pass | Pass | Pass |
| Compression Set (%) | 79 | 61 | NM | 70 | NM | NM |
| Compression Set improvement over C₁ (%) | — | 22 | — | 11 | — | — |

*PHR IS PARTS PER HUNDRED PARTS FP-A
NM—NOT MEASURED

The invention claimed is:

1. A compound comprising:
    A) a fluoroelastomer A comprising copolymerized units of:
        (1) at least one fluorinated olefin A(1);
        (2) at least one co-monomer A(2) different from fluorinated olefin A(1) selected from the group consisting of fluorovinyl ethers, fluorinated olefins, olefins, and mixtures of these;
        (3) at least one chain transfer agent or fluorinated monomer comprising cure sites;
    B) 0.1 to 10 parts per 100 parts fluoroelastomer A of at least one co-agent B selected from the group consisting of triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, N,N-diallylacrylamide, and combinations of these;
    C) 0.05 to 5 parts per 100 parts fluoroelastomer A of at least one chemical entity C comprising an azo functional group selected from the group consisting of formulas (XIII), (XIV), and (XV):

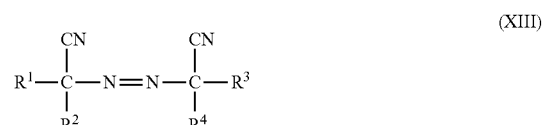

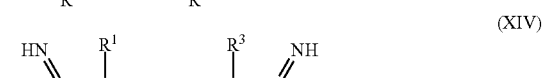

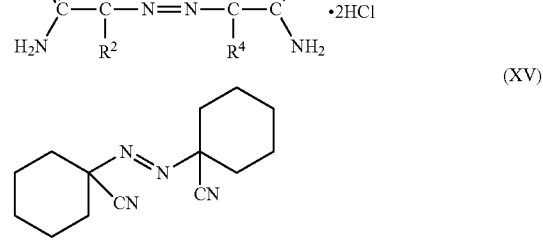

wherein:
    each of $R^1$, $R^2$, $R^3$, and $R^4$ is selected from the group consisting of $C_1$ to $C_8$ alkyl groups in which the alkyl group is linear, branched, or cyclic; and combinations of these; and D) 0.01 to 10 parts per 100 parts fluoroelastomer A of a peroxide curing agent;
wherein, when the compound has been cured into an article, the article exhibits no visible particles on the article surface when viewed at a magnification of 500 times that of an unmagnified image.

2. The compound of claim 1, wherein fluorinated olefin A(1) is selected from the group consisting of tetrafluoroethylene, hexafluoropropylene, 1,1-difluoroethylene; 1,1,2-trifluoroethylene; 1-fluoroethylene, and mixtures of these.

3. The compound of claim 1, wherein co-agent B is selected from the group consisting of triallyl cyanurate, trimethacryl isocyanurate, triallyl isocyanurate, trimethallyl isocyanurate, and combinations of these.

4. The compound of claim 1, wherein the chemical entity C comprising an azo functional group is selected from the group consisting of 2,2'-azobis-(2-methylpropionamidine) dihydrochloride; 1,1'-azobiscyclohexanecarbonitrile; and 2,2'-azobis-(2-isobutyronitrile).

5. The compound of claim 1, further comprising at least one additive.

6. The compound of claim 5, wherein the at least one additive is selected from the group comprising nonperfluoro-fluorine-containing elastomers, micropowders, carbon black, stabilizers, plasticizers, lubricants, processing aids, and mixtures of these.

7. The compound of claim 1, wherein co-monomer A(2) is at least one fluorovinyl ether selected from the group consisting of perfluoro(alkyl vinyl) ethers, perfluoro(alkoxy vinyl) ethers, fluoro(alkyl vinyl) ethers, fluoro(alkoxy vinyl) ethers, and mixtures of these.

8. The compound of claim 7, wherein fluorinated olefin co-monomer A(2) is selected from the group consisting of perfluoro(methyl vinyl) ether, perfluoro(propyl vinyl) ether, and mixtures of these.

9. An article comprising a cured compound that, before curing, comprised:
A) a fluoroelastomer A comprising copolymerized units of:
(1) at least one fluorinated olefin A(1) ;
(2) at least one co-monomer A(2) different from fluorinated olefin A(1) selected from the group consisting of fluorovinyl ethers, fluorinated olefins, olefins, and mixtures of these;
(3) at least one chain transfer agent or fluorinated monomer comprising cure sites;
B) 0.1 to 10 parts per 100 parts fluoroelastomer A of at least one co-agent B selected from the group consisting of triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, N,N-diallylacrylamide, and combinations of these;
C) 0.05 to 5 parts per 100 parts fluoroelastomer A of at least one chemical entity C comprising an azo functional group selected from the group consisting of formulas (XIII), (XIV), and (XV):

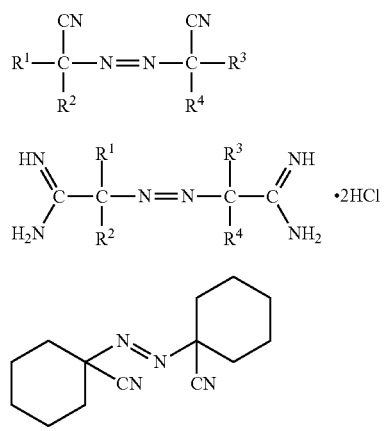

wherein:
each of $R^1$, $R^2$, $R^3$, and $R^4$ is selected from the group consisting of $C_1$ to $C_8$ alkyl groups in which the alkyl group is linear, branched, or cyclic; and combinations of these; and
D) 0.01 to 10 parts per 100 parts fluoroelastomer A of a peroxide curing agent;
wherein, the article exhibits no visible particles on the article surface when viewed at a magnification of 500 times that of an unmagnified image.

10. The article of claim 9 in the form of a gasket, tube, seal, or O-ring.

11. The article of claim 9 in which chemical entity C comprises an azo functional group and wherein the article has a compression set of 70 percent or less when measured at 200 ° C. for 672 hours in air according to ASTM D395-89.

12. The article of claim 9, wherein fluorinated olefin A(1) is selected from the group consisting of tetrafluoroethylene, hexafluoropropylene, 1,1-difluoroethylene; 1,1,2-trifluoroethylene; 1-fluoroethylene, and mixtures of these.

13. The article of claim 9, wherein co-monomer A(2) is at least one fluorovinyl ether selected from the group consisting of perfluoro(alkyl vinyl) ethers, perfluoro(alkoxy vinyl) ethers, fluoro(alkyl vinyl) ethers, fluoro(alkoxy vinyl) ethers, and mixtures of these.

14. A process comprising the steps of:
a) providing a fluoroelastomer A comprising copolymerized units of:
(1) at least one fluorinated olefin A(1);
(2) at least one co-monomer A(2) different from fluorinated olefin A(1) selected from the group consisting of fluorovinyl ethers, fluorinated olefins, olefins, and mixtures of these;
(3) at least one chain transfer agent or fluorinated monomer comprising cure sites; and
b) curing fluoroelastomer A with at least one co-agent B, a chemical entity C comprising an azo functional group, and a peroxide curing agent, said chemical entity C selected from the group consisting of formulas (XIII), (XIV), and (XV):

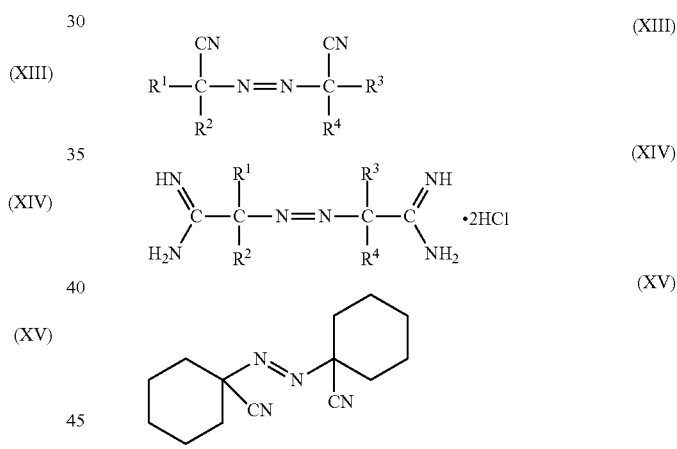

wherein:
each of $R^1$, $R^2$, $R^3$, and $R^4$ is selected from the group consisting of $C_1$ to $C_8$ alkyl groups in which the alkyl group is linear, branched, or cyclic; and combinations of these.

15. The process of claim 14, wherein fluorinated olefin A(1) is selected from the group consisting of tetrafluoroethylene, hexafluoropropylene, 1,1-difluoroethylene; 1,1,2-trifluoroethylene; 1-fluoroethylene, and mixtures of these.

16. The process of claim 14, wherein co-monomer A(2) is at least one fluorovinyl ether selected from the group consisting of perfluoro(alkyl vinyl) ethers, perfluoro(alkoxy vinyl) ethers, fluoro(alkyl vinyl) ethers, fluoro(alkoxy vinyl) ethers, and mixtures of these.

* * * * *